US012576698B2

(12) United States Patent
Estrada Lagunas et al.

(10) Patent No.: US 12,576,698 B2
(45) Date of Patent: Mar. 17, 2026

(54) VEHICLE DOOR ASSEMBLY

(71) Applicant: Nissan North America, Inc., Franklin, TN (US)

(72) Inventors: Felipe Estrada Lagunas, Toluca (MX); Jose Manuel Ruiz Villegas, Toluca (MX); Edgar Montes De Oca Contreras, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 138 days.

(21) Appl. No.: 17/427,897

(22) PCT Filed: Mar. 19, 2019

(86) PCT No.: PCT/US2019/022996
§ 371 (c)(1),
(2) Date: Aug. 2, 2021

(87) PCT Pub. No.: WO2020/190282
PCT Pub. Date: Sep. 24, 2020

(65) Prior Publication Data
US 2022/0105787 A1     Apr. 7, 2022

(51) Int. Cl.
B60J 5/04          (2006.01)

(52) U.S. Cl.
CPC .......... B60J 5/0434 (2013.01); B60J 5/0425 (2013.01); B60J 5/0426 (2013.01); B60J 5/045 (2013.01)

(58) Field of Classification Search
CPC .......... B60J 5/0434; B60J 5/0425–0426; B60J 5/0433; B60J 5/0423; B60J 5/045; B60J 5/0427; B60J 5/0431; B60J 5/0438

USPC .......................................... 49/502; 296/146.6
See application file for complete search history.

(56) References Cited

U.S. PATENT DOCUMENTS

| | | | | |
|---|---|---|---|---|
| 4,306,381 | A | * | 12/1981 | Presto .................... B60J 5/0413 49/502 |
| 5,505,024 | A | * | 4/1996 | DeRees .................. B60J 5/0412 49/502 |
| 5,553,910 | A | * | 9/1996 | Park ....................... B60J 5/0447 49/502 |
| 5,904,002 | A | * | 5/1999 | Emerling ............... B60J 5/0418 49/502 |

(Continued)

FOREIGN PATENT DOCUMENTS

| | | | | | |
|---|---|---|---|---|---|
| CN | 111845291 | A | * | 10/2020 | |
| DE | 112005000407 | T5 | * | 3/2007 | ........... B60J 5/0405 |
| WO | WO-9745283 | A1 | * | 12/1997 | ........... B60J 5/0406 |

OTHER PUBLICATIONS

International Search Report in PCT/US2019/018670 dated Apr. 24, 2019.
Written Opinion, mailed on Apr. 24, 2019.

*Primary Examiner* — Daniel P Cahn
*Assistant Examiner* — Patrick B. Ponciano
(74) *Attorney, Agent, or Firm* — Spencer Fane, LLP

(57) ABSTRACT

A vehicle door assembly includes an outer panel and an inner panel. The outer panel has an inboard surface and an outboard surface. A door handle receiving area is disposed in the outer door panel and is configured to receive a door handle. The inner panel has an inboard surface and an outboard surface. The inner panel is connected to the outer panel. A first stiffener member is disposed beneath the door handle receiving area. A second stiffener member is disposed above the door handle receiving area.

18 Claims, 7 Drawing Sheets

(56)                References Cited

U.S. PATENT DOCUMENTS

| | | | | |
|---|---|---|---|---|
| 5,906,409 | A * | 5/1999 | DeRees | B60R 13/0243 |
| | | | | 296/146.7 |
| 6,056,349 | A | 5/2000 | Seksaria et al. | |
| 6,196,619 | B1 | 3/2001 | Townsend et al. | |
| 7,231,717 | B2 * | 6/2007 | Wurm | B60J 5/0463 |
| | | | | 29/469 |
| 7,766,414 | B2 * | 8/2010 | Krajewski | B60J 5/0431 |
| | | | | 296/193.03 |
| 7,794,008 | B2 * | 9/2010 | Hall | B60J 5/0434 |
| | | | | 296/153 |
| 7,857,375 | B2 * | 12/2010 | Huttsell | B60R 21/0428 |
| | | | | 296/187.05 |
| 8,162,360 | B2 * | 4/2012 | Takaya | E05B 79/04 |
| | | | | 292/336.3 |
| 8,491,046 | B2 * | 7/2013 | Nagai | B62D 25/02 |
| | | | | 296/193.06 |
| 8,955,257 | B2 * | 2/2015 | Moriya | B60J 5/042 |
| | | | | 49/502 |

| | | | | |
|---|---|---|---|---|
| 9,592,721 | B1 | 3/2017 | Kelly et al. | |
| 10,099,541 | B2 * | 10/2018 | Baccouche | B29D 99/0003 |
| 10,286,762 | B2 * | 5/2019 | Ogawa | B60J 5/0426 |
| 10,350,976 | B2 * | 7/2019 | Moriyama | B60J 5/0416 |
| 11,065,945 | B2 * | 7/2021 | Martino | B60J 5/0427 |
| 11,260,731 | B2 * | 3/2022 | Itou | B60J 5/0418 |
| 11,466,481 | B2 * | 10/2022 | Muta | B60J 5/0413 |
| 11,833,892 | B2 * | 12/2023 | Barz | B60J 5/0468 |
| 12,311,743 | B2 * | 5/2025 | Dey | E05B 77/10 |
| 2008/0007087 | A1 * | 1/2008 | Endo | B60J 5/0431 |
| 2011/0099913 | A1 | 5/2011 | Narayana et al. | |
| 2013/0074413 | A1 * | 3/2013 | Moriya | B60J 5/0461 |
| | | | | 49/394 |
| 2017/0036521 | A1 * | 2/2017 | Ogawa | B62D 29/04 |
| 2017/0240031 | A1 | 8/2017 | Moriyama | |
| 2019/0168588 | A1 * | 6/2019 | Suzuki | B60J 5/043 |
| 2022/0324306 | A1 * | 10/2022 | Thor | B60J 5/0416 |
| 2023/0166586 | A1 * | 6/2023 | Dey | B60J 5/0468 |
| | | | | 49/374 |

* cited by examiner

VEHICLE DOOR ASSEMBLY

BACKGROUND

Field of the Invention

The present invention generally relates to a vehicle door assembly. More specifically, the present invention relates to a vehicle door assembly including a stiffener assembly to reduce deformation of a vehicle door during a side impact event.

Background Information

Vehicle structures often include structural features that absorb impact forces generated during an impact event.

SUMMARY

An object of the disclosure is to provide a vehicle door assembly configured to reduce deformation of a vehicle door during a side impact event.

In view of the state of the known technology, one aspect of the present disclosure is to provide a vehicle door assembly including an outer panel and an inner panel. The outer panel has an inboard surface and an outboard surface. A door handle receiving area is disposed in the outer door panel and is configured to receive a door handle. The inner panel has an inboard surface and an outboard surface. The inner panel is connected to the outer panel. A first stiffener member is disposed beneath the door handle receiving area. A second stiffener member is disposed above the door handle receiving area.

Another aspect of the present invention includes a vehicle door assembly having an outer panel and an inner panel. The outer panel has an inboard surface and an outboard surface. A door handle receiving area is disposed in the outer door panel and is configured to receive a door handle. The inner panel has an inboard surface and an outboard surface. The inner panel is connected to the outer panel. A stiffener assembly is disposed beneath the door handle receiving area. The stiffener assembly surrounds at least two sides of the door handle receiving area.

Also other objects, features, aspects and advantages of the disclosed vehicle door assembly will become apparent to those skilled in the art from the following detailed description, which, taken in conjunction with the annexed drawings, discloses exemplary embodiments of the vehicle door assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
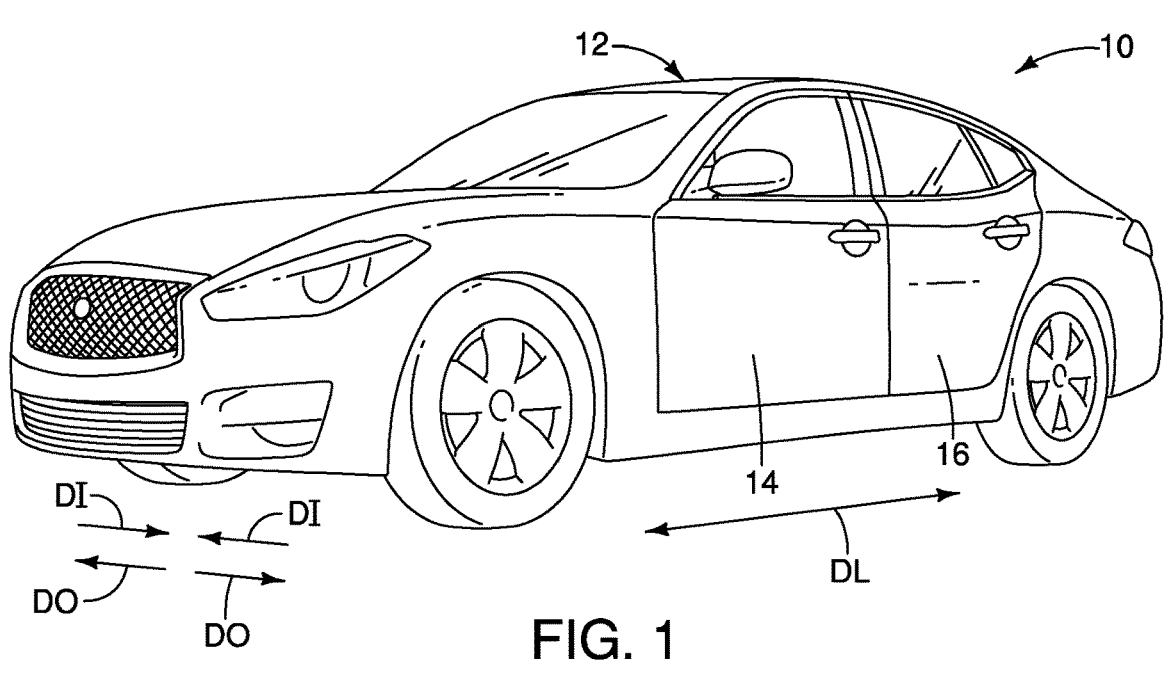
FIG. 1 is a perspective view of a vehicle including a stiffener assembly in accordance with a first exemplary embodiment of the present invention.

Referring initially to FIG. 1, a vehicle 10 is illustrated in accordance with a first exemplary embodiment. The vehicle 10 includes a vehicle body structure 12 with front doors 14 and rear doors 16.

As shown in FIG. 1, a plurality of differing directions is defined relative to the vehicle 10. The directions include a vehicle longitudinal direction DL, a vehicle inboard direction DI, and a vehicle outboard direction DO. The vehicle inboard direction DI and the vehicle outboard direction DO are defined relative to an imaginary center line of the vehicle 10, where the imaginary center line extends in the vehicle longitudinal direction DL of the vehicle 10. Reference to the inboard and outboard directions in the following description are with respect to the defined vehicle directions.

The vehicle 10 is depicted as a four door sedan. However, the vehicle 10 can be any of a variety of vehicle designs, such as a crew cab pickup truck, an SUV (sports utility vehicle) or other four door vehicle design.

Figure 2:
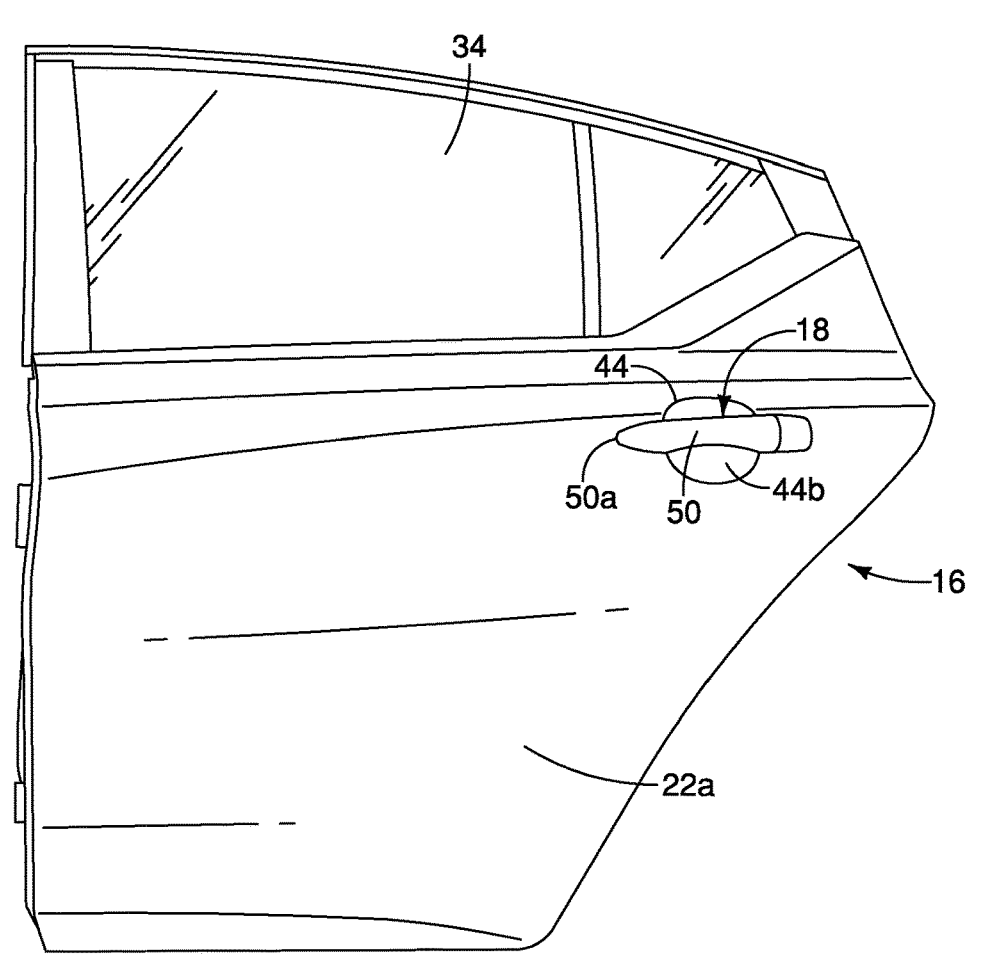
FIG. 2 is a side elevational view of a rear door assembly removed from the vehicle of FIG. 1.

One of the rear doors 16 is shown removed from the vehicle 10 in FIG. 2. For the sake of brevity, only one of the rear doors 16 is described herein below. However, the description below of features of the rear door 16 applies equally to both rear doors 16.

The rear door, or vehicle door assembly, 16 has a door handle assembly 18 that is manually operated to open the rear door 16 from outside the vehicle 10 in a conventional manner.

As shown in FIGS. 3-6, the vehicle door assembly 16 includes an inner door panel, or inner panel, 20, an outer door panel, or outer panel, 22, a plurality of reinforcement members, or brace members, 24, 26, 28 and 30, and the door handle assembly 18. The plurality of reinforcement members include a first reinforcement member 24 extending substantially in the longitudinal direction DL of the vehicle, a second reinforcement member 26 extending from the first reinforcement member to an outer edge of the vehicle door assembly 16, a third reinforcement member 28 extending substantially in the longitudinal direction DL, and a fourth reinforcement member 30 extending substantially in the longitudinal direction DL. Each of the first, second, third and fourth reinforcement members 24, 26, 28 and 30 is connected to the inner panel 20. Preferably, each of the first, second, third and fourth reinforcement members 24, 26, 28 and 30 is made of metal, such as steel, although any suitable material can be used. The first, second, third and fourth reinforcement members 24, 26, 28 and 30 are preferably connected to the inner panel 20 by spot welding, although any suitable means can be used to secure the reinforcement members to the inner panel. The inner panel 20 is shown with four reinforcement members connected thereto, although any suitable number of reinforcement members can be used.

Figure 3:
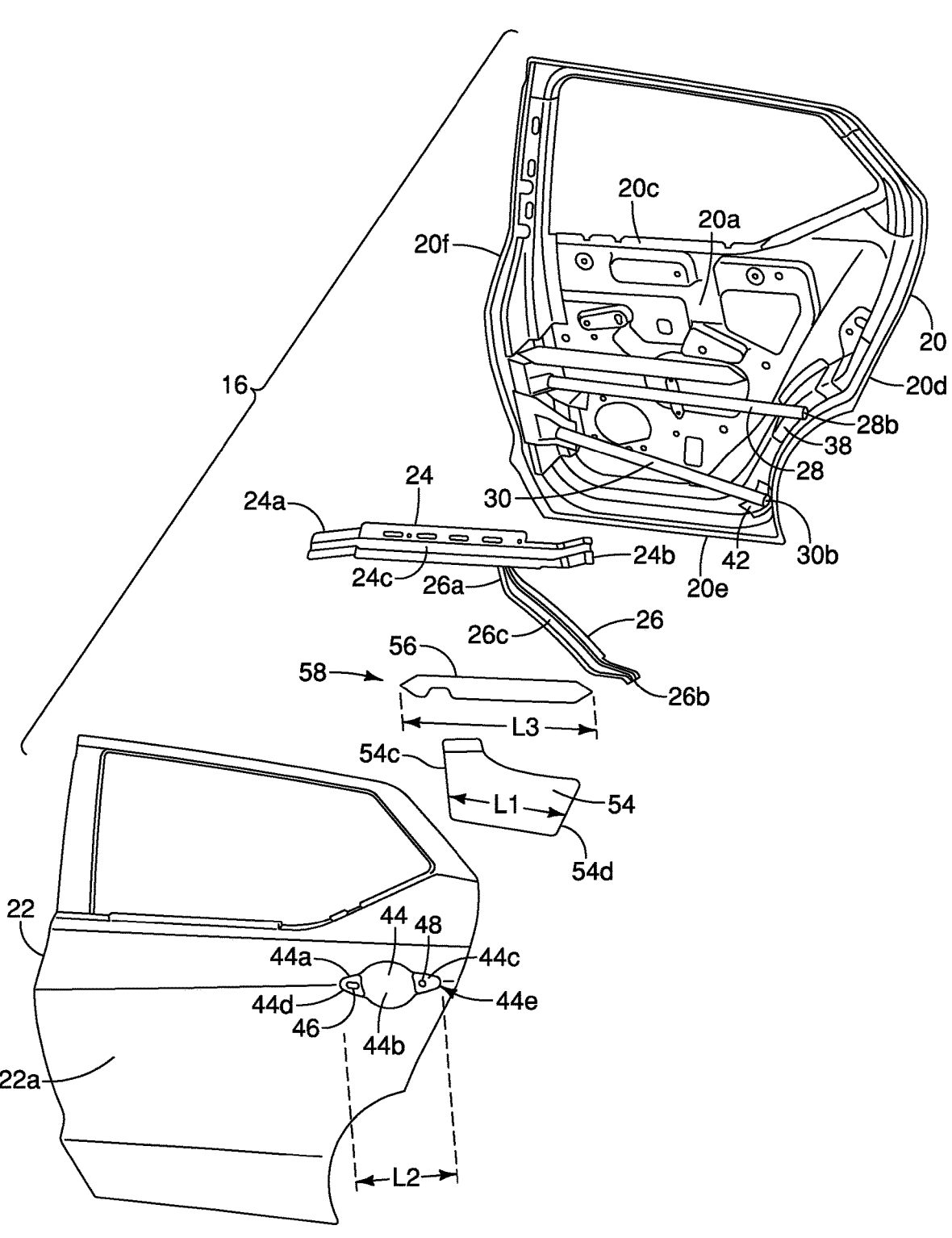
FIG. 3 is an exploded perspective view of the door assembly of FIG. 2.
Figure 6:
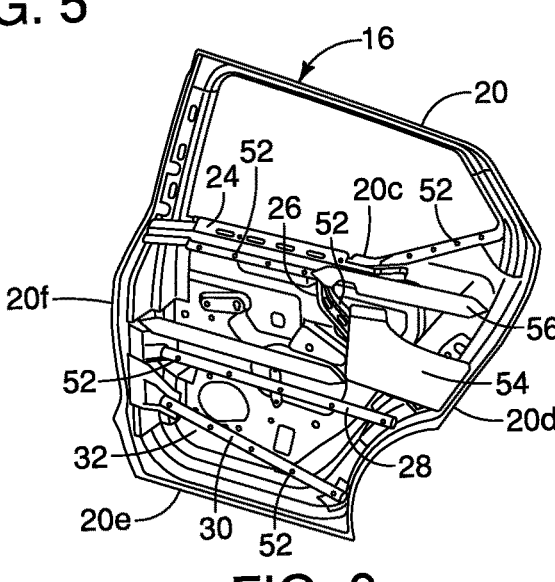
FIG. 6 is a perspective view of the door assembly of FIG. 2 with the outer panel removed.
Figure 7:
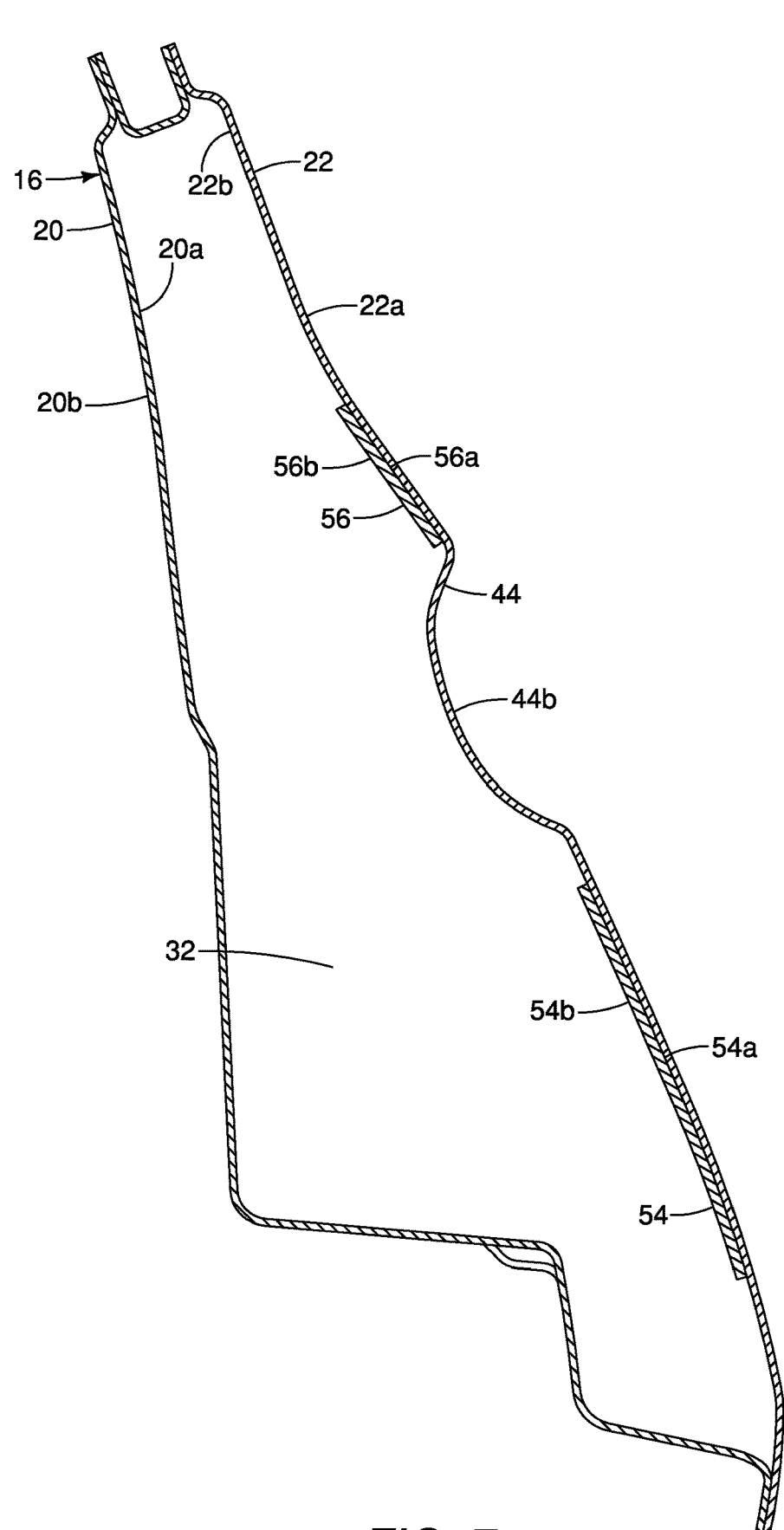
FIG. 7 is an elevational view in cross section of the door assembly of FIG. 4.

As shown in FIGS. 3, 6 and 7, the inner door panel 20 has an outboard surface 20a and an inboard surface 20b. The inner door panel 20 defines a hollow recessed area or cavity 32 that is concealed with the outer door panel 22 attached to the inner door panel 20 and the vehicle door assembly 16 fully assembled. The cavity 32 is defined by the space between the outboard surface 20a of the inner door panel 20 and an inboard surface 22b of the outer door panel 22. The inner door panel 20 and the outer door panel 22 are connected to one another in a conventional manner, such as by welding or with an adhesive. For example, an outer periphery of the inner door panel 20 can be fixed to a corresponding outer periphery of the outer door panel 22 via any of a variety of welding techniques or adhesives.

An upper edge 20e of the inner door panel 20 includes a slot configured to receive a glass window 34 that is supported and operated to move up and down by a window supporting mechanism (not shown) in a conventional manner, as shown in FIGS. 2 and 3. A rearward edge 20d of the inner door panel 20 extends downward from a rear end of the upper edge 20c to a bottom edge 20e. The rearward edge 20d can be configured to complement the shape and contours of a rear wheel well of the vehicle 10. The bottom edge 20e is generally straight and extends horizontally (with the vehicle 10 being level) from a lower end of the rearward edge 20d to a lower edge of a forward edge 20f The forward edge 20f extends upward from a front end of the bottom edge 20e to a forward end of the upper edge 20c.

The first reinforcement member 24 has a forward, or first, end 24a and a rearward, or second, end 24b. The first reinforcement member 24 further has an inboard facing surface (not shown) and an outboard facing surface 24c. The forward and rearward ends 24a and 24b, each of which preferably includes an attachment flange, are rigidly attached to the inner door panel 20 via, for example, one of a variety of conventional welding techniques or mechanical fasteners. The first reinforcement member 24 is a longitudinally extending bracket within the cavity H that extends along the upper edge 20c of the inner door panel 20.

As shown in FIGS. 3-6, the forward end 24a is fixed proximate to the forward edge 20f of the inner door panel 20. The rearward end 24b of the first reinforcement member 24 is fixed to the inner door panel 20 at a longitudinal position proximate to a first end 44d of the door handle receiving area 44 of the door handle assembly 18. The first reinforcement member 24 is spaced from the door handle assembly 18.

The second reinforcement member 26 has an upper, or first, end 26a and a lower, or second, end 26b. The second reinforcement member 26 further has an inboard facing surface (not shown) and an outboard facing surface 26c. The upper end 26a, which preferably includes an upper attachment flange, is rigidly attached to the first reinforcement member 24 of the inner door panel 20 via, for example one of a variety of conventional welding techniques or mechanical fasteners. The upper end 26a of the second reinforcement member 26 is disposed above a door handle receiving area 44. Similarly, the lower end 26b, which preferably includes an attachment flange, is rigidly attached to the inner door panel 20 adjacent to the rearward edge 20d via, for example, any one of a variety of conventional welding techniques or mechanical fasteners. The lower end 26b of the second reinforcement member 26 is disposed below the door handle receiving area 44. The second reinforcement member 26 is an upwardly extending bracket within the cavity H that extends upwardly from the rearward edge 20d of the inner door panel 20 to the first reinforcement member 24 proximate the upper edge 20c of the inner door panel 20. The second reinforcement member 26 is angularly inclined relative to the vertical.

As shown in FIGS. 3-6, the upper end 26a and the lower end 26b of the second reinforcement member 26 is shown fixed to the first reinforcement member 24 and to the inner door panel 20, respectively. The upper end 26a of the second reinforcement member 26 is fixedly connected to the first reinforcement member 24 proximate a central area of a window opening defined by the rear door assembly 16. The second reinforcement member 26 is spaced from the door handle assembly 18.

The third reinforcement member 28 is preferably a tubular member, as shown in FIGS. 3 to 6. Alternatively, the third reinforcement member can be a ribbed member similar to the first and second reinforcement members 24 and 26. A forward end 28a of the third reinforcement beam 28 is fixed to the forward edge 20f of the inner door panel 20 via an attachment flange 36. A rearward end 28b of the third reinforcement member 28 is fixed to the rearward edge 20d of the inner door panel 20 via an attachment flange 38. The third reinforcement beam 28 basically extends side to side from proximate the forward edge 20f to proximate the rearward edge 20d. The third reinforcement member 28 is disposed below the door handle assembly 18.

The fourth reinforcement member 30 is preferably a tubular member, as shown in FIGS. 3 to 6. Alternatively, the fourth reinforcement member 30 can be a ribbed member similar to the first and second reinforcement members 24 and 26. A forward end 30a of the fourth reinforcement beam 30 is fixed to the forward edge 20f of the inner door panel 20 via an attachment flange 40. A rearward end 30b of the fourth reinforcement member 30 is fixed to the rearward edge 20d of the inner door panel 20 via an attachment flange 42. The fourth reinforcement member 30 basically extends side to side from proximate the forward edge 20f to proximate the rearward edge 20d. The fourth reinforcement member 30 is preferably inclined such that the forward end 30a is fixed to the inner door panel 20 at a position higher than the rearward end 30b. The fourth reinforcement member 30 is disposed below the third reinforcement member 28.

As shown in FIGS. 2, 3 and 7, the outer door panel 22 has an outboard surface 22a and an inboard surface 22b. The door handle assembly 18 is connected to the outer door panel 22. The door handle assembly 18 includes the door handle receiving area 44 disposed in the outboard surface 22a of the outer door panel 22 and is configured to receive a door handle 50. The door handle receiving area 44 includes first, second and third concave portions 44a, 44b and 44c. The first end 44d of the door handle receiving area 44 is defined by a most forward end of the first concave portion 44a. A second end 44e of the door handle receiving area 44 is defined by a most rearward end of the third concave portion 44c. A first handle opening 46 is disposed in the first concave portion 44a and a second handle opening 48 is disposed in the third concave portion 44c. The second handle opening 48 is disposed rearward of the first handle opening 46. Each of the first handle opening 46 and the second handle opening 48 extends from the outboard surface 22a to the inboard surface of the outer door panel 22. The second concave portion 44b is disposed between the first concave portion 44a and the second concave portion 44c. The second concave portion 44b is shaped and dimensioned to accommodate a person's hand when gripping the door handle, or operation handle, 50 to open the rear door assembly 16. The door handle 50 is configured to pivot about a forward end 50a when opening the vehicle door assembly 16.

As shown in FIG. 6, each of the first, second, third and fourth reinforcement members 24, 26, 28 and 30 can include an application of a mastic seal 52 to further facilitate securing the outer door panel 22 to the inner door panel 20 through the reinforcement members 24, 26, 28 and 30.

A first stiffener member 54 is disposed beneath the door handle receiving area 44, as shown in FIGS. 4-7. The first stiffener member 54 is connected to the inboard surface 22b of the outer door panel 22. The first stiffener member 54 is preferably connected to the inboard surface 22b with an adhesive pad, although the first stiffener member 54 can be connected in any suitable manner. The outboard, or first, surface 54a of the first stiffener member 54 is disposed adjacent the inboard surface 22b of the outer door panel 22. The inboard, or second, surface 54b of the first stiffener member 54 faces the cavity 32 and the outboard surface 20a of the inner door panel 20. The first stiffener member 54 is preferably made of an epoxy resin with fiberglass, although any suitable material can be used. The first stiffener member 54 reduces deformation of the vehicle door assembly 16 during a side impact event.

A first, or forward, end 54c of the first stiffener member 54 is disposed forward of the first end 44d of the door handle receiving area 44. The second, or rearward, end 54d of the first stiffener 54 is disposed rearward of the first, second, third and fourth reinforcement members 24, 26, 28 and 30. A length L1 from the first end 54c to the second end 54d of the first stiffener member 54 is greater than a length L2 from the first end 44d to the second end 44e of the door handle receiving area 44, as shown in FIG. 3. The first stiffener member 54 preferably extends along at least fifty percent of the length L2 of the door handle receiving area 44.

Figure 4:
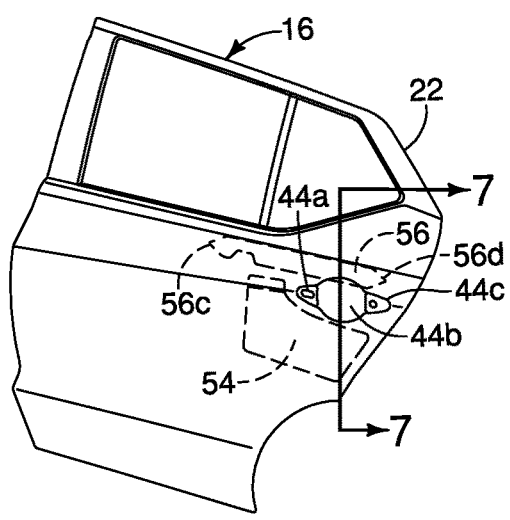
FIG. 4 is a perspective view of the door assembly of FIG. 2 in which an outer panel is partially transparent to illustrate a stiffener assembly.
Figure 5:
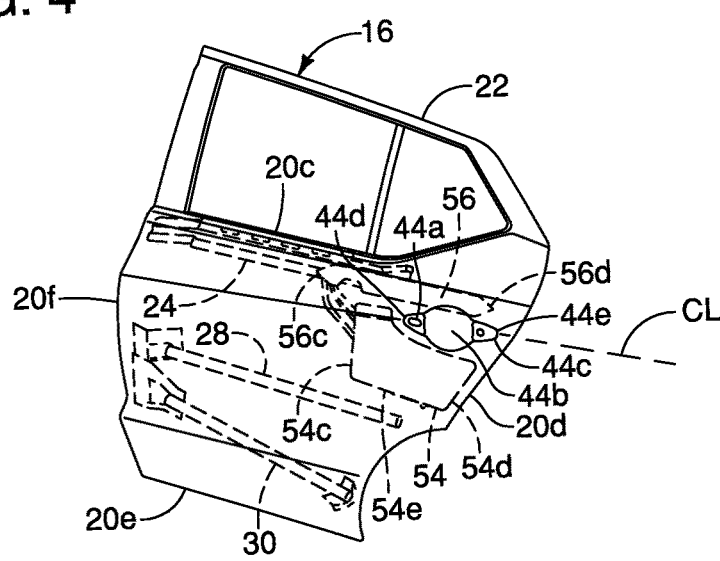
FIG. 5 is a perspective view of the door assembly of FIG. 2 in which an outer panel is completely transparent.

The first stiffener member 54 is substantially L-shaped, as shown in FIGS. 3-6, although the first stiffener member 54 can have any suitable shape. A portion of the first stiffener member 54 is disposed above a longitudinal centerline CL of the door handle receiving area 44, as shown in FIG. 5. The first end 54c of the first stiffener member 54 extends farther from a lower end 54e of the first stiffener member 54 than the second end 54d extends from the lower end 54e of the first stiffener member 54. A second end 44e of the door handle receiving area 44 is disposed rearward of the rearward end 54d of the first stiffener member 54, as shown in FIGS. 4 and 5.

As shown in FIGS. 5 and 6, the first stiffener member 54 is disposed between the first reinforcement member 24 and the third reinforcement member 28. The first stiffener member 54 overlaps the second reinforcement member 26 when viewed in an inboard direction of the vehicle 10 (the vehicle inboard direction DI shown in FIG. 1).

A second stiffener member 56 is disposed above the door handle receiving area 44, as shown in FIGS. 4-7. The second stiffener member is preferably connected to the inboard surface 22b of the outer door panel 22. The second stiffener member is preferably connected to the inboard surface 22b with an adhesive pad, although the second stiffener member can be connected in any suitable manner. The outboard, or first, surface 56a of the second stiffener member 56 is disposed adjacent the inboard surface 22b of the outer door panel 22, as shown in FIG. 7. The inboard, or second surface 54b of the second stiffener member 56 faces the cavity 32 and the outboard surface 20a of the inner door panel 20. The second stiffener member is preferably made of an epoxy resin with fiberglass, although any suitable material can be used. The second stiffener member reduces deformation of the vehicle door assembly 16 during a side impact event.

A first, or forward, end 56c of the second stiffener member 56 is disposed forward of the first end 44d of the door handle receiving area 44. The second, or rearward, end 54d of the second stiffener 56 is disposed rearward of the first, second, third and fourth reinforcement members 24, 26, 28 and 30. A length L3 from the first end 56c to the second end 56d of the second stiffener member 56 is greater than a length L2 from the first end 44d to the second end 44e of the door handle receiving area 44, as shown in FIG. 3. The second stiffener member 56 preferably extends along at least fifty percent of the length L2 of the door handle receiving area 44. The forward end 56c of the second stiffener member 56 is disposed forward of the forward end 54c of the first stiffener member 54. A second end 44e of the door handle receiving area 44 is disposed rearward of the rearward end 56d of the second stiffener member 56, as shown in FIGS. 4 and 5.

As shown in FIGS. 4 and 5, the first stiffener member 54 is disposed above the door handle receiving area 44 and the second stiffener member 56 is disposed beneath the door handle receiving area 44. The first stiffener member 54 surrounds the door handle receiving area 44 on the lower and forward sides. The second stiffener member 56 surrounds the door handle receiving area 44 on the upper side. The first and second stiffener members 54 and 56 surround the door handle receiving area 44 on three sides (upper, lower and forward sides). A stiffener assembly 58 includes at least the first stiffener member 54 that surrounds the door handle receiving area 44 on at least two sides, such as the forward and lower sides shown in FIGS. 4 and 5). The stiffener assembly 58 can include the second stiffener assembly to surround the door handle receiving area on three sides.

Figures 8, 9:
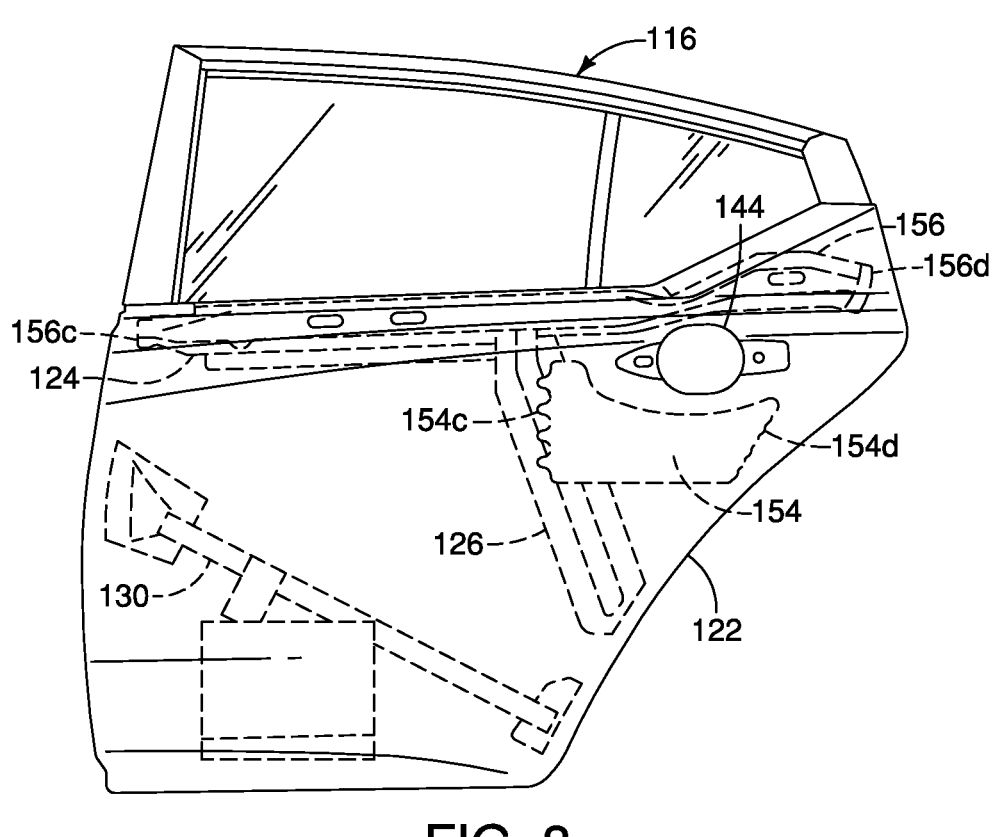
FIG. 8 is a side elevational view of a door assembly in which an outer panel is completely transparent in accordance with a second exemplary embodiment of the present invention.
FIG. 9 is a side elevational view of the door assembly of FIG. 8 with the outer panel removed.

Another exemplary embodiment of the vehicle door assembly 116 is shown in FIGS. 8 and 9. The features of the vehicle door assembly 116 of FIGS. 8 and 9 that are substantially similar to the features of the vehicle door assembly 16 of FIGS. 1-7 are provided the same reference numerals as the features of the vehicle door assembly 16. Moreover, the descriptions of the parts of the vehicle door assembly 116 of FIGS. 8 and 9 that are identical to the vehicle door assembly 16 of FIGS. 1-7 are omitted for the sake of brevity.

The vehicle door assembly 116 of FIGS. 8 and 9 includes a first reinforcement member 124, a second reinforcement member 126, and a fourth reinforcement member 130. The first, second and fourth reinforcement members 124, 126 and 130 are configured substantially similarly as the first, second and fourth reinforcement members 24, 26 and 30 of the vehicle door assembly 16 of FIGS. 1-7.

The first stiffener member 154 is configured substantially similarly as the first stiffener member 54 of the vehicle door assembly 16 of FIGS. 1-7. The first and second ends 154c and 154d of the first stiffener member 154 are shown having a contoured shape, although the ends can have any suitable shape. The contoured first and second ends 154c and 154d of the first stiffener member 154 of FIGS. 8 and 9 facilitate maximizing blank usage when manufacturing the first stiffener member, thereby minimizing waste.

The second stiffener member 156 is connected to the outboard surface 120*a* of the inner panel 120 of the vehicle door assembly 116. The second stiffener member 156 can be connected to the first reinforcement member, such as by welding or any other suitable method. Alternatively, the first reinforcement member 124 and the second stiffener member 156 can be integrally formed as a single, one-piece member. The second stiffener member 156 is a metallic reinforcement member, preferably made of steel.

As shown in FIGS. 8 and 9, the first end 156*c* of the second stiffener member 156 is disposed forward of the door handle receiving area 144 of the outer door panel 122. A second end 156*d* of the second stiffener member 156 is disposed rearward of the door handle receiving area 144.

As shown in FIGS. 8 and 9, the first end 156*c* of the second stiffener member 156 is disposed forward of the first end 154*c* of the first stiffener member 154. The second end 156*d* of the second stiffener member 156 is disposed rearward of the second end 154*d* of the first stiffener member 154. The first and second stiffener members 154 and 156 substantially surround three sides (upper, lower and front) of the door handle receiving area 144.

Figure 10:
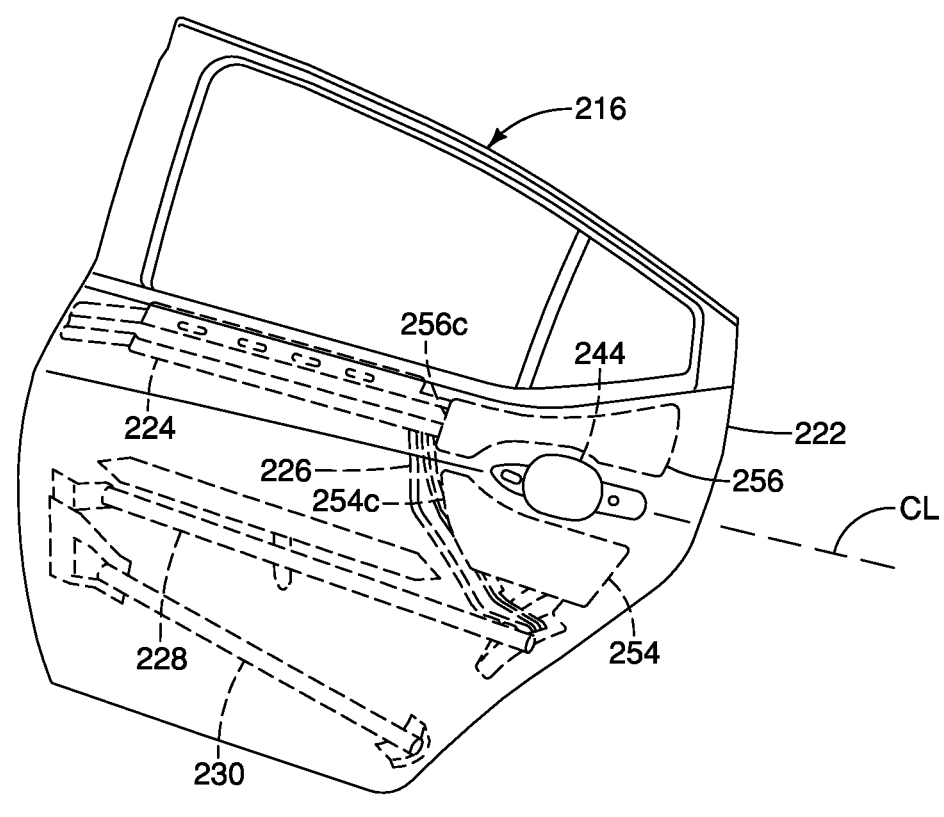
FIG. 10 is a perspective view of a door assembly in which an outer panel is transparent in accordance with a third exemplary embodiment of the present invention.
Figure 11:
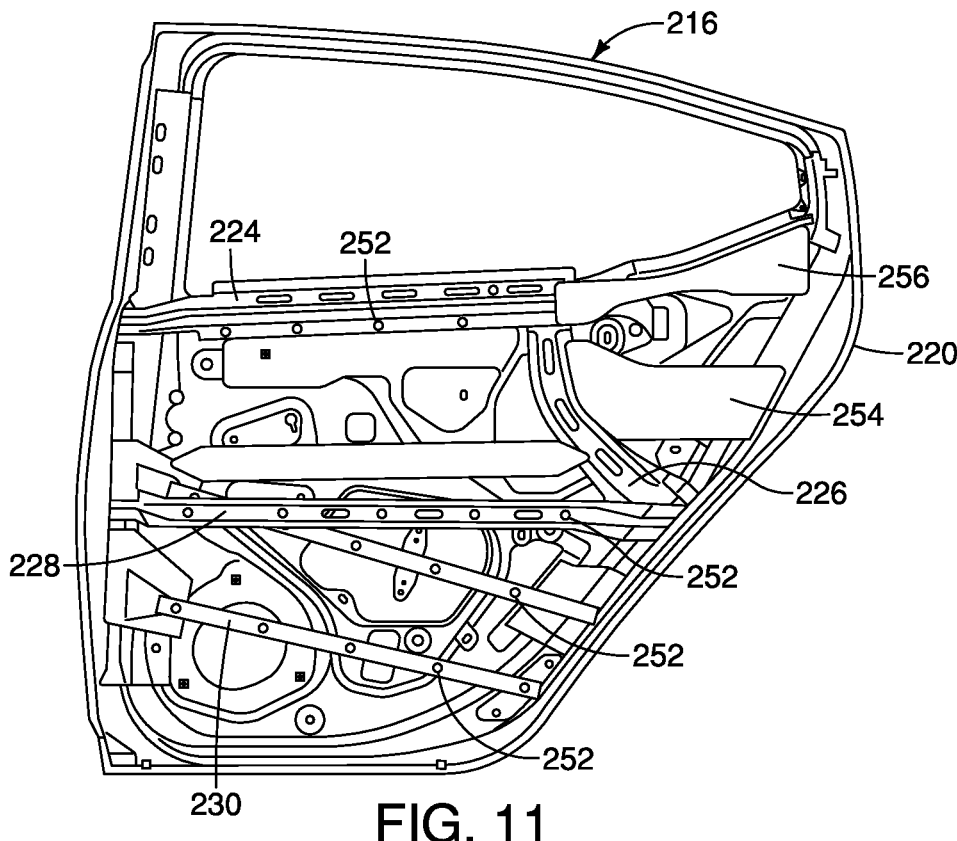
FIG. 11 is a side elevational view of the door assembly of FIG. 10 with the outer panel removed.
Figure 12:
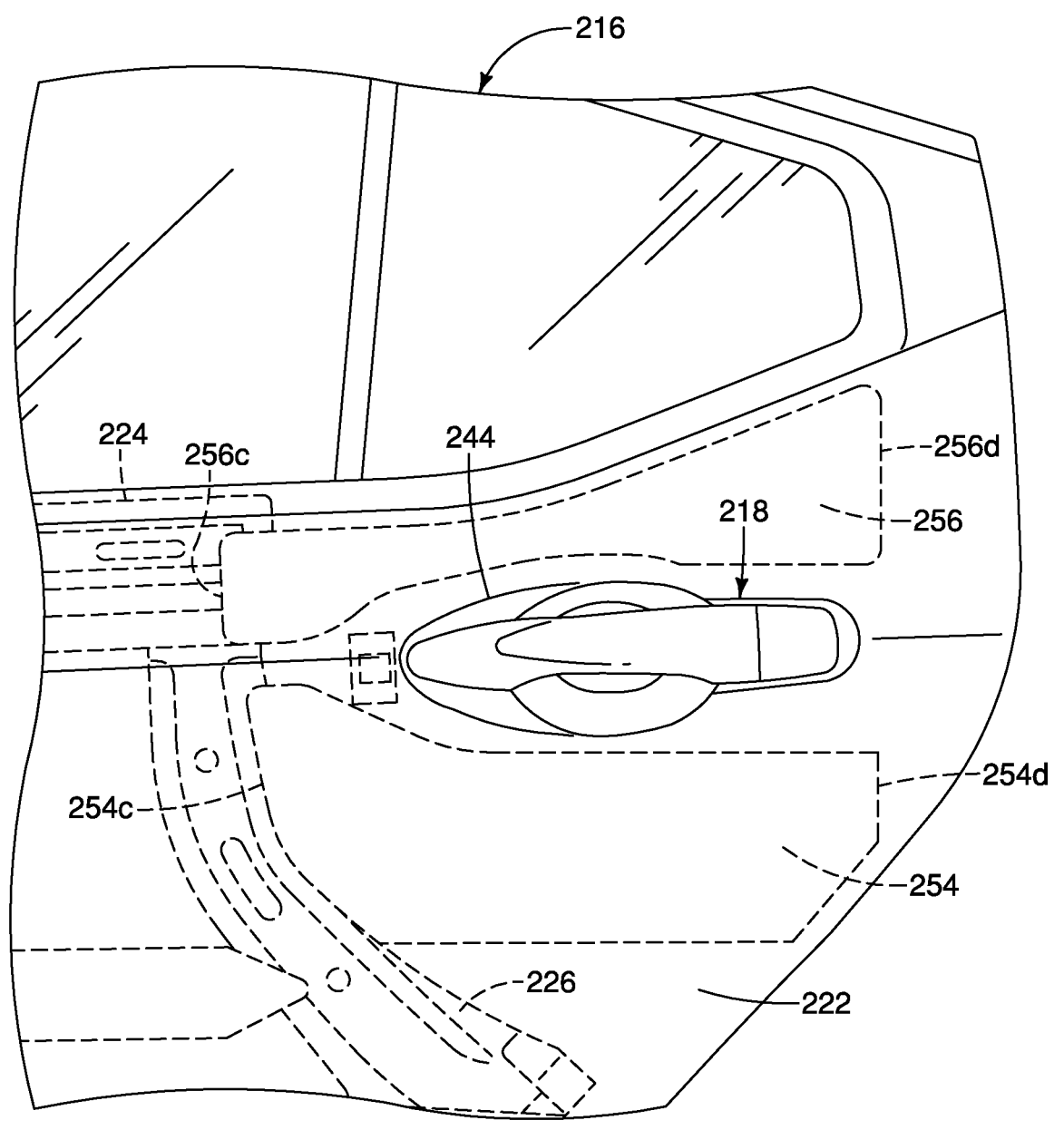
FIG. 12 is a side elevational view of the door assembly of FIG. 10.

Another exemplary embodiment of the vehicle door assembly is shown in FIGS. 10-12. The features of the vehicle door assembly 216 of FIGS. 10-12 that are substantially similar to the features of the vehicle door assembly 16 of FIGS. 1-7 are provided the same reference numerals as the features of the vehicle door assembly 16. Moreover, the descriptions of the parts of the vehicle door assembly 216 of FIGS. 10-12 that are identical to the vehicle door assembly 16 of FIGS. 1-7 are omitted for the sake of brevity.

The vehicle door assembly 216 of FIGS. 10-12 includes the first reinforcement member 224, the second reinforcement member 226, the third reinforcement member 228, and the fourth reinforcement member 130. The first, second, third and fourth reinforcement members 224, 226, 228 and 230 are configured substantially similarly as the first, second, third and fourth reinforcement members 24, 26, 28 and 30 of the vehicle door assembly 16 of FIGS. 1-7. A mastic seal 252 can be applied to the first, second, third and fourth reinforcement members 224, 226, 228 and 230 to further facilitate securing the outer door panel 222 to the inner door panel 220 through the reinforcement members 24, 26, 28 and 30.

The first stiffener member 254 is configured substantially similarly as the first stiffener member 54 of the vehicle door assembly 16 of FIGS. 1-7. The first end 254*c* of the first stiffener member 254 does not extend over the centerline CL of the door handle receiving area 244. The second end 254*d* of the first stiffener member 254 is disposed rearward of the rearward end of the door handle receiving area 244.

The second stiffener member 256 is configured substantially similarly as the second stiffener member 56 of the vehicle door assembly 16 of FIGS. 1-7. The first end 256*c* of the second stiffener member 256 extends toward the centerline CL of the door handle receiving area 244. The first end 256*c* of the second stiffener member 256 does not extend over the centerline CL of the door handle receiving area 244. The second end 256*d* of the second stiffener member 256 is disposed rearward of the door handle receiving area 244.

The portions of the first stiffener member 254 and the second stiffener member 256 extend toward one another and toward the centerline CL of the door handle receiving area 244, and together substantially surround the forward end of the door handle receiving area 244. The first and second stiffener members 254 and 256 substantially surround three sides (upper, lower and front) of the door handle receiving area 244.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
    an outer panel having an inboard surface and an outboard surface, a door handle receiving area disposed in the outer panel being configured to receive a door handle;
    an inner panel having an inboard surface and an outboard surface, the inner panel being connected to the outer panel;
    a first stiffener member disposed beneath the door handle receiving area, a first end of the first stiffener member extending farther from a lower end of the first stiffener member in a direction substantially perpendicular to the lower end of the first stiffener member than a second end of the first stiffener member extends from the lower end of the first stiffener member in the direction substantially perpendicular to the lower end of the first stiffener member, the first end of the first stiffener member extending toward a longitudinal centerline of the door handle receiving area, an entirety of the first stiffener member being substantially L-shaped when viewed in a direction perpendicular to the outboard surface of the outer panel, the substantially L-shaped first stiffener member being defined by the first end and the lower end of the first stiffener member, the first end being a forwardmost end of the first stiffener member and the second end being a rearmost end of the first stiffener member in a longitudinal direction of longitudinal centerline of the door handle receiving area; and a second stiffener member disposed above the door handle receiving area, an entirety of the second stiffener member being spaced from an entirety of the first stiffener member.

2. The vehicle door assembly according to claim 1, wherein the first stiffener member is connected to the inboard surface of the outer panel.

3. The vehicle door assembly according to claim 2, wherein a brace member is connected to the inner panel, the brace member having a first end disposed above the door handle receiving area and a second end disposed below the door handle receiving area.

4. The vehicle door assembly according to claim 3, wherein the first stiffener member overlaps the brace member when viewed in an inboard direction of a vehicle.

5. The vehicle door assembly according to claim 2, wherein the first stiffener member is made of an epoxy resin with fiberglass.

6. The vehicle door assembly according to claim 5, wherein the first end of the first stiffener member is disposed forward of a first end of the door handle receiving area.

7. The vehicle door assembly according to claim 5, wherein a portion of the first stiffener member is disposed above the longitudinal centerline of the door handle receiving area.

8. The vehicle door assembly according to claim 5, wherein a second end of the door handle receiving area is disposed rearward of the second end of the first stiffener member and rearward of a second end of the second stiffener member.

9. The vehicle door assembly according to claim 5, wherein the first stiffener member extends along at least fifty percent of a length of the door handle receiving area.

10. The vehicle door assembly according to claim 1, wherein the second stiffener member is connected to the inner panel.

11. The vehicle door assembly according to claim 10, wherein the second stiffener member is a metallic reinforcement member.

12. The vehicle door assembly according to claim 11, wherein the second stiffener member is welded to the inner panel.

13. The vehicle door assembly according to claim 11, wherein the second stiffener member has a first end disposed forward of the door handle receiving area and a second end disposed rearward of the door handle receiving area.

14. The vehicle door assembly according to claim 11, wherein a first end of the second stiffener member is disposed forward of the first end of the first stiffener member, and a second end of the second stiffener member is disposed rearward of the second end of the first stiffener member.

15. The vehicle door assembly according to claim 1, wherein the second stiffener member is made of an epoxy resin with fiberglass.

16. The vehicle door assembly according to claim 15, wherein the second stiffener member is connected to the inboard surface of the outer panel.

17. The vehicle door assembly according to claim 16, wherein a first end of the second stiffener member is disposed forward of the first end of the first stiffener member.

18. The vehicle door assembly according to claim 16, wherein the second stiffener member extends along at least fifty percent of a length of the door handle receiving area.

* * * * *